T. HART.
MIDDLINGS SEPARATOR.
No. 177,242. Patented May 9, 1876.
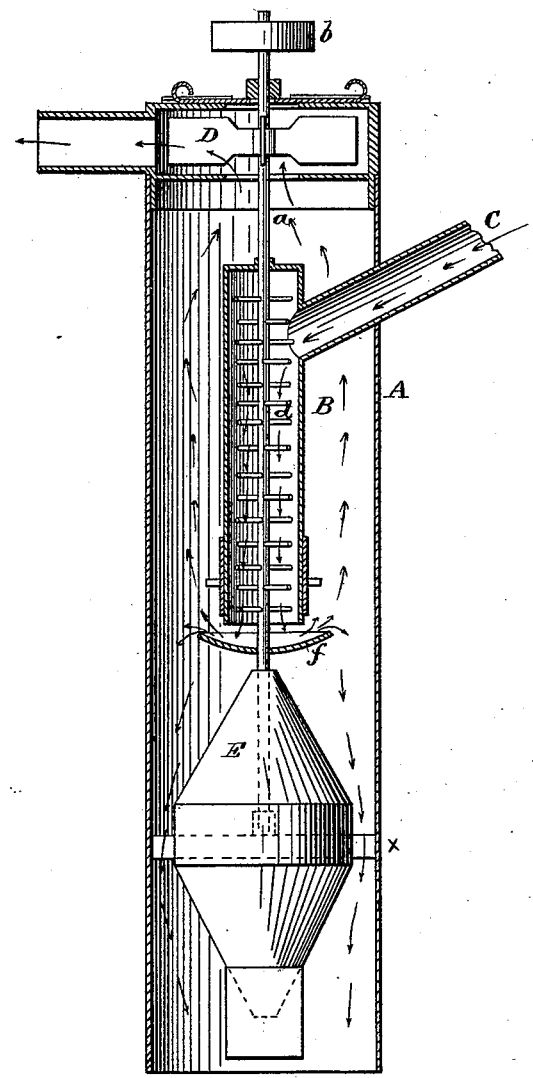
WITNESSES
Henry N. Miller
C. R. Ewert
INVENTOR
Thomas Hart.
By Alexander Mason
Attorneys.

UNITED STATES PATENT OFFICE.

THOMAS HART, OF BATTLE CREEK, MICHIGAN.

IMPROVEMENT IN MIDDLINGS-SEPARATORS.

Specification forming part of Letters Patent No. 177,242, dated May 9, 1876; application filed March 21, 1876.

*To all whom it may concern:*

Be it known that I, THOMAS HART, of Battle Creek, in the county of Calhoun, and in the State of Michigan, have invented certain new and useful Improvements in Middlings-Purifiers; and do hereby declare that the following is a full, clear, and exact description thereof, reference being had to the accompanying drawings, and to the letters of reference marked thereon, making a part of this specification.

My invention relates to middlings-purifiers, and has for its object to take that portion of the product already beyond the "bolt" and subject it to a beating process before it reaches an air-current, and afterward discharging it horizontally into a vertical chamber of sufficient length at or near the bottom of said chamber, where the product will come in contact with a constantly-ascending current of air, by means of which the dust and fiber will be eliminated from the product and the purified middlings secured, while the dust and worthless portions alone are carried upward and out of the fan-chamber.

The drawing represents a vertical section of my invention.

A is an upright cylindrical chamber, containing a vertical tube or conductor, B, provided with an inlet-spout, C, passing through the chamber near the top. The conductor or tube B contains a vertical shaft, $a$, provided with drive-pulley $b$ for propelling the same, and carrying the fan D and beaters $d\,d$, and centrifugal disk $f$. The shaft $a$ has its support and journal in a double cone, E, which serves the several purposes of contracting the chamber at this point or space for the ascending air, in order to give it an increased velocity there, and for protecting the journal from dust, while its form prevents an undue accumulation of the product thereon.

The operation is as follows: Rapid motion is given to the shaft $a$ by means of the pulley $b$. The fan D serves to exhaust the air from the space surrounding the tube B, tending to create a vacuum which is immediately relieved by the incoming air passing upward around the double cone E, or between it and the inside of the cylinder A at the point $x$. As will be readily seen, the air-current is at its maximum at the point $x$, while the minimum thereof will be at the inlet to the fan-chamber at the top of the chamber A. The product enters the purifier by the spout C, and, passing downward along the tube or conductor B, encounters the rapidly-revolving beaters $d$, and, being confined to the only outlet at the bottom— its top being closed, so that no current of air can reach the product at this stage—it is thoroughly whipped and beaten in its descent, so that when it is precipitated from the rapidly-revolving centrifugal disk $f$, provided at the bottom of the tube B, it is very evenly distributed throughout the column of the constantly-ascending air-current, passing upward, whereby the already-separated dust, fiber, and middlings are gradually eliminated from each other, the purified product falling downward by reason of the greater specific gravity past the swiftest air-current at the point $x$, which current effectually presents a barrier to the lightest portions, which are carried upward and out with the ascending air.

Having thus fully described my invention, what I claim as new, and desire to secure by Letters Patent, is—

1. The double cone E, in combination with the chamber A, shaft $a$, and conductor B, having beaters $d\,d$, as and for the purposes herein set forth.

2. The combination of the chamber A, conductor B, fan D, revolving shaft $a$, with beaters $d$ and disk $f$, and the double cone E, all constructed and arranged to operate substantially as and for the purposes herein set forth.

In testimony that I claim the foregoing I have hereunto set my hand this 26th day of February, 1876.

THOS. HART.

Witnesses:
JOS. H. WEEKS,
MARTIN METCALF.